United States Patent
Vohra

(10) Patent No.: US 9,499,414 B1
(45) Date of Patent: Nov. 22, 2016

(54) METHOD OF DYE REMOVAL FROM WASTEWATER

(71) Applicant: KING FAHD UNIVERSITY OF PETROLEUM AND MINERALS, Dhahran (SA)

(72) Inventor: Muhammad Shariq Vohra, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/701,135

(22) Filed: Apr. 30, 2015

(51) Int. Cl.
C02F 1/28 (2006.01)
C02F 101/30 (2006.01)

(52) U.S. Cl.
CPC ............ *C02F 1/283* (2013.01); *C02F 1/288* (2013.01); *C02F 2101/308* (2013.01)

(58) Field of Classification Search
CPC .. C02F 1/283; C02F 1/288; C02F 2101/308; C01B 31/08; C01B 31/12
USPC .................. 210/694, 917; 502/425, 426, 437
See application file for complete search history.

(56) References Cited

U.S. PATENT DOCUMENTS

| | | | |
|---|---|---|---|
| 2,029,966 A * | 2/1936 | Urbain | C02F 1/283 210/694 |
| 5,429,747 A * | 7/1995 | Carr | C02F 1/283 210/650 |
| 6,379,555 B1 | 4/2002 | Targosz | |
| 2014/0208945 A1* | 7/2014 | Satterfield | C01B 31/08 95/108 |

FOREIGN PATENT DOCUMENTS

CN 102951696 3/2013

OTHER PUBLICATIONS

Alqaragully, Removal of Textile Dyes (Maxion Blue, and Methyl Orange) by Date Stones Activated Carbon, Mar. 2014, International Journal of Advanced Research in Chemical Sciences, vol. 1, Issue 1, pp. 48-59.*
Davini, Flue gas treatment by activated carbon obtained from oi-fired fly ash, Jan. 2002, Carbon, vol. 40, pp. 1973-1979.*
Vohra, Production and Use of Heavy Oil Fly Ash Based Activated Carbon: Surface Properties and Affect of Surface Charge Properties on Mass Transfer of Cationic Dyes, May 2014, Proceedings of the International Conference on New Trends in Transport Phenomenon, Ottawa, Canada, May 1-2 2014, Paper No. 88, one page.*
Mofarrah et al, Characterization of activated carbon obtained from Saudi Arabian Fly ash, Sep. 2013, International Journal of Environmental Science and Technology, vol. 11, pp. 159-168.*
Geetha et al., "Removal of Heavy Metals and Dyes Using Low Cost Adsorbents From Aqueous Medium, a Review," IOSR Journal of Environmental Science, Toxicology and Food Technology (IOSR-JESTFT), 2013, vol. 4, pp. 56-68.
Caramuscio P. et al., "Preparation of activated carbons from heavy-oil fly ashes." Waste Management, 2003, 23, pp. 345-351.
Davini P. "Flue gas treatment by activated carbon obtained from oil fired fly ash." Carbon 2002, 40, 1973-1979.

* cited by examiner

Primary Examiner — Matthew O Savage
(74) Attorney, Agent, or Firm — Richard C. Litman

(57) ABSTRACT

A method of dye removal from wastewater includes producing activated carbon from heavy oil fly ash and using the activated carbon to adsorb dye in the wastewater. The heavy oil fly ash based activated carbon is produced using phosphoric acid based chemical activation. The dye can be removed from wastewater by contacting the wastewater with the activated carbon. The activated carbon can then be separated from the wastewater to remove the dye, and thereby, purify the wastewater.

6 Claims, 2 Drawing Sheets

METHOD OF DYE REMOVAL FROM WASTEWATER

ACKNOWLEDGMENT OF PROJECT FUNDING

The present invention was developed with financial support from the National Plan for Science, Technology and Innovation (MAARIFAH)—King Abdulaziz City for Science and Technology—the Kingdom of Saudi Arabia.

BACKGROUND OF THE INVENTION

1. Field of the Invention

The present invention relates to a method of dye removal from wastewater, and particularly to a method of dye removal from wastewater using activated carbon produced from heavy oil fly ash.

2. Description of the Related Art

Electric power plants worldwide produce millions of tons of heavy oil fly ash (OFA) as a waste material, the disposal of which is a major environmental concern. Oil fly ash is generally disposed in landfills. Recently, however, some progress has been made to find ways to utilize, rather than simply dispose, oil fly ash. For example, oil fly ash has been used for the preparation of activated carbon. Caramuscio et al. describe pyrolyzing raw fly ash at 900° C. followed by $CO_2$ initiated physical activation process at a temperature range of 800-900° C. for different times. The highest specific surface area value ($SSA_{BET}$) achieved using nitrogen adsorption isotherm was 156 m²/g. Davini studied treatment of the heavy oil fly ash with acidic solutions and physical activation. The resulting activated carbon sample showed high specific surface area values (BET nitrogen adsorption isotherm) and surface basic characteristics.

Water pollution due to dyes from wastewater has been a major cause of concern for the environment. The use of activated carbon for wastewater treatment has been reported by some researchers. For example, some studies reported granular activated carbon (GAC) and powdered activated carbon (PAC) adsorptive removal of dye contaminated wastewater.

Thus, a method of dye removal from wastewater solving the aforementioned problems is desired.

SUMMARY OF THE INVENTION

A method of dye removal from wastewater includes producing activated carbon from heavy oil fly ash using chemical activation and using the activated carbon to adsorb dye in the wastewater. Heavy oil fly ash (OFA) based activated carbon can be produced using phosphoric acid based chemical activation. The $SSA_{BET}$ values of the activated carbon can be about 59 m²/g. The dye can be one or more aqueous dyes, including Rhodamine B and/or Methyl Orange, for example. The dye can be removed from wastewater by contacting the wastewater with the activated carbon. The activated carbon can then be separated from the wastewater to remove the dye, and thereby, purify the wastewater.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
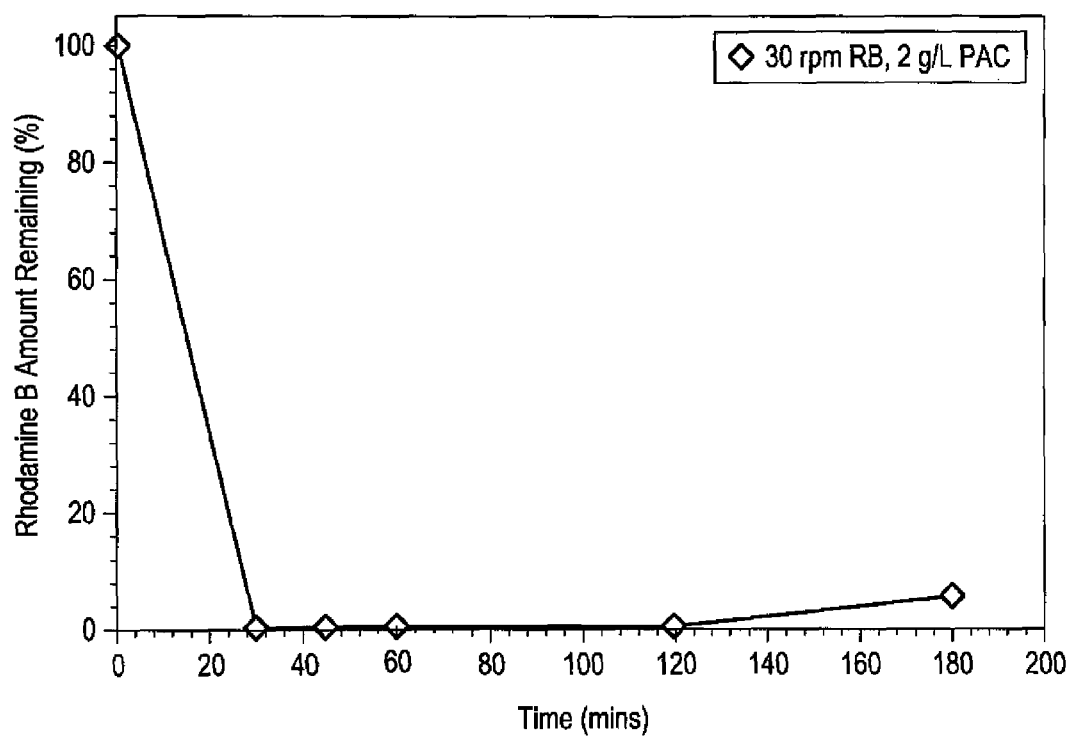
FIG. 1 is a graph showing the effect of contact time on the removal of Rhodamine B from synthetic wastewater using powdered activated carbon (PAC).

A method of dye removal from wastewater includes producing activated carbon from heavy oil fly ash and using the activated carbon to adsorb dye in the wastewater. The present inventor has discovered that heavy oil fly ash (OFA) based activated carbon that is produced using phosphoric acid based chemical activation can be used for the removal of aqueous phase dyes, such as Rhodamine B and Methyl Orange. The dyes can be removed from wastewater by contacting the wastewater with the activated carbon. The activated carbon can then be separated from the wastewater to purify the wastewater.

Producing the activated carbon includes phosphoric acid based chemical activation of heavy oil fly ash waste. The heavy oil fly ash waste can be impregnated with phosphoric acid to form an impregnated material. The phosphoric acid strength can be about 40 w/w %. The impregnation ratio can be about 0.8. The impregnated material can then be heated under an inert atmosphere to produce the activated carbon. The furnace temperature for heating the impregnated fly ash can be about 450° C. to about 900° C. Preferably, the furnace temperature is about 500° C. The $SSA_{BET}$ values of the activated carbon can be about 59 m²/g. The activated carbon can be powdered activated carbon (PAC).

Separating the PAC from the wastewater can be accomplished by passing the wastewater through a solid-liquid separation device for removal of the powdered activated carbon. The solid-liquid separation device can be a filter paper such as a Whatman filter paper or any other filtration means. The dyes that can be removed from the wastewater can be Rhodamine B, Methyl Orange or any other aqueous dye. The PAC is allowed to adsorb for a period of time, e.g., at least 20 minutes, before separation and filtration. The concentration of the powdered activated carbon can be in the range of 250 mg/L to 4,000 mg/L and preferably it is 2,500 mg/L.

Rhodamine B (RB) is a chemical dye with IUPAC name [9-(2-carboxyphenyl)-6-diethylamino-3-xanthenylidene]-diethylammonium chloride. It is often used as a tracer dye within water because it strongly fluoresces and can thus be detected easily with fluorometers. It has the molecular structure as follows:

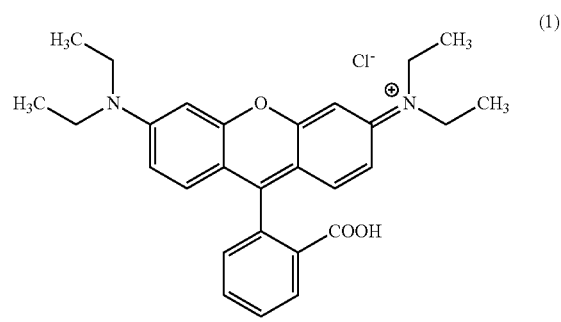 [SMILES: CCN(CC)c1ccc2c(-c3ccccc3C(=O)O)c3ccc(=[N+](CC)CC)cc-3oc2c1 ; [Cl-]]

Methyl orange (MO) is an intensely colored compound used in dyeing and printing textiles. Its IUPAC name is Sodium 4-[(4-dimethylamino)phenyldiazenyl]benzenesulfonate and has a molecular structure as follows:

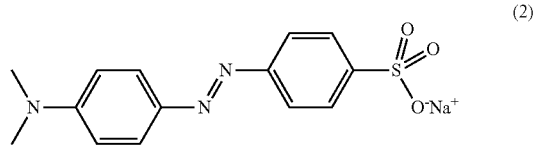

(2)

Several activated carbon (AC) samples were produced using the chemical activation method described herein. The variables included phosphoric acid strength (w/w %), impregnation ratio (R; volume of acid to weight of fly ash) and furnace temperature. The optimum values of these variables included phosphoric acid strength of 40 w/w %, impregnation ratio of 0.8 (R=0.8), and furnace temperature of 500° C. The AC samples produced showed different $SSA_{BET}$ values with an optimum value equal to 59 m²/g.

The conversion of OFA into powdered activated carbon (PAC) offers the dual advantage of providing an environmentally sound OFA waste treatment and an industrial grade product (activated carbon) that can be used for a variety of pollution control applications. In particular, the PAC produced from OFA waste material offers an excellent end product to treat industrial wastewaters containing dye based pollutants (e.g., Rhodamine B and methyl orange) even at relatively high concentrations. As such, the present methods provide a green technology solution to handling wastewater containing dyes.

The following examples will further illustrate the method of wastewater treatment using powdered activated carbon obtained from heavy oil fly ash and should not be construed as specifically limiting the invention described and claimed herein.

Example 1

Adsorption Studies

Adsorption experiments were conducted using 250 ml Pyrex glass bottles. 1000 ppm stock solutions were prepared for Rhodamine B (RB) and Methyl Orange (MO) using reagent grade chemicals and high-purity water. 100 ml test solutions were then prepared using high-purity water and respective stock solution. A blank sample was taken before the addition of the required powdered activated carbon (PAC) amount. This was followed by pH adjustment to the desired value using HCl or NaOH solutions. The test solution was then kept in suspension using IKA multi-position magnetic stirrer set-up. Kinetic studies were achieved by withdrawing samples at different time intervals for three hours. The effects of pH, PAC dosage and initial dye concentration were determined by running experiments until adsorption reached equilibrium. All samples collected were filtered with 0.2 μm membrane filters (Whatman, Germany) and the concentrations of RB and MO were analyzed using Shimadzu UV-Spectrophotometer at 599 and 278 nm respectively.

Example 2

Effect of Contact Time on the Removal of Rhodamine B

In a container comprising 30 ppm of Rhodamine B solution at pH 4, 2 g/L of powdered activated carbon (produced by the present methods) was added while stirring. The concentration of the Rhodamine B was monitored over time by a spectrophotometer. FIG. 1 shows the sample kinetic study findings for Rhodamine B from synthetic wastewater using the 2 g/L concentration. As shown in FIG. 1, most of the dye is removed from the aqueous phase within 30 minutes of adsorption time. After about three hours of contact time, the synthetic wastewater solution was very clear compared to the solution at the beginning of the experiment.

Example 3

Effect of PAC Dosage and Dye Concentration in Synthetic Wastewater

Figure 2:
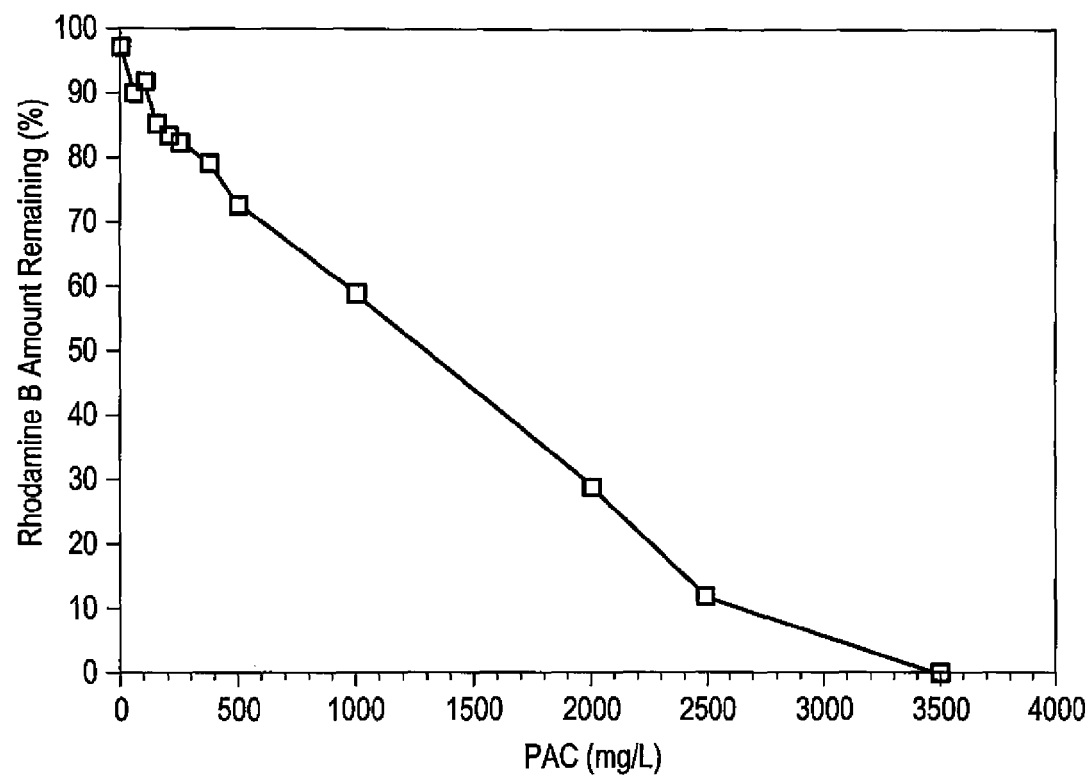
FIG. 2 is a graph showing the effect of the powdered activated carbon (PAC) dosage on the adsorption based removal of Rhodamine B from a synthetic wastewater sample.

Powdered activated carbon (PAC) obtained from phosphoric acid based chemical activation of heavy oil fly ash was added to synthetic wastewater containing 100 ppm of Rhodamine B (pH4). The concentration of the Rhodamine B was monitored by successively increasing the concentration of the powdered activated carbon (PAC). FIG. 2 depicts the effect of the powdered activated carbon dosage on the adsorption based removal of Rhodamine B from synthetic wastewater sample (Rhodamine B-100 ppm; solution pH=4). Several days were allowed to pass until adsorption equilibrium was reached. The findings clearly show that even a relatively high concentration of Rhodamine B (about 100 ppm) is efficiently removed from synthetic wastewater using powdered activated carbon (PAC) produced from heavy oil fly ash (OFA) waste material using chemical activation method as described herein.

It is to be understood that the present invention is not limited to the embodiments described above, but encompasses any and all embodiments within the scope of the following claims.

I claim:

1. A method of dye removal from wastewater, comprising:
impregnating heavy oil fly ash with phosphoric acid to provide an impregnated material, wherein the impregnation ratio of the phosphoric acid and the heavy oil fly ash is 0.8;
heating the impregnated material under an inert atmosphere to temperatures of 500° C. to provide powdered activated carbon (PAC), wherein the $SSA_{BET}$ value of the activated carbon is 59 m²/g;
contacting the wastewater with the powdered activated carbon, wherein the contacting is for a period of at least 20 minutes;
adsorbing dye from the wastewater by the powdered activated carbon;
separating the powdered activated carbon from the wastewater to remove the adsorbed dye.

2. The method of dye removal from wastewater according to claim 1, wherein the separating is performed by filtering the wastewater using a 0.2 μm membrane filter.

3. The method of dye removal from wastewater according to claim 1, wherein the dye is selected from the group consisting of Rhodamine B, Methyl Orange and mixtures thereof.

4. The method of dye removal from wastewater using activated carbon according to claim 1, wherein the concentration of the powdered activated carbon is in the range of 100 mg/L to 4,000 mg/L.

5. The method of dye removal from wastewater using activated carbon according to claim 1, wherein the concentration of the powdered activated carbon is 2,000 mg/L.

6. The method of dye removal from wastewater using activated carbon according to claim 1, wherein a pH of the wastewater is maintained at a value of a pH of 3 to a pH of 8.

* * * * *